US007127315B2

(12) United States Patent
Junge et al.

(10) Patent No.: US 7,127,315 B2
(45) Date of Patent: Oct. 24, 2006

(54) METHOD AND APPARATUS FOR ACTING ON ARTICLES IN THE TOBACCO-PROCESSING INDUSTRY

(75) Inventors: Christian Junge, Escheburg (DE); Karsten Eckert, Hamburg (DE); Frank Grothaus, Hamburg (DE); Bernhard Brinkmann, Börnsen (DE); Michael Straube, Hamburg (DE); Helge Frauen, Geesthacht (DE); Torsten Lietzke, Pinneberg (DE)

(73) Assignee: Hauni Maschinenbau AG, Hamburg (DE)

( * ) Notice: Subject to any disclaimer, the term of this patent is extended or adjusted under 35 U.S.C. 154(b) by 417 days.

(21) Appl. No.: 10/411,366

(22) Filed: Apr. 11, 2003

(65) Prior Publication Data

US 2004/0045563 A1 Mar. 11, 2004

(30) Foreign Application Priority Data

Apr. 11, 2002 (DE) ................................ 102 16 069

(51) Int. Cl.
*G06F 19/00* (2006.01)

(52) U.S. Cl. ...................... 700/109; 700/159; 700/226; 198/246; 362/89

(58) Field of Classification Search ................ 700/129, 700/200, 92, 109, 159, 180, 28, 115, 225, 700/226, 95, 116; 198/246, 243; 702/81; 362/89, 94, 251, 253; 131/280; 264/401
See application file for complete search history.

(56) References Cited

U.S. PATENT DOCUMENTS

| | | | | |
|---|---|---|---|---|
| 4,484,591 | A | 11/1984 | Wahle et al. | |
| 5,228,462 | A * | 7/1993 | Osmalov et al. | 131/280 |
| 5,366,064 | A * | 11/1994 | Gamberini et al. | 198/426 |
| 5,366,096 | A * | 11/1994 | Miller | 209/535 |
| 5,960,374 | A * | 9/1999 | Lausier | 702/81 |
| 6,020,969 | A * | 2/2000 | Struckhoff et al. | 356/430 |
| 6,198,537 | B1 * | 3/2001 | Bokelman et al. | 356/429 |
| 2003/0182014 | A1 * | 9/2003 | McDonnell et al. | 700/159 |

FOREIGN PATENT DOCUMENTS

| | | |
|---|---|---|
| DE | 19 00 701 | 8/1970 |
| DE | 211 3841 | 10/1971 |
| DE | 32 11 111 | 5/2001 |
| WO | WO 00/16647 | 3/2000 |

* cited by examiner

*Primary Examiner*—Kidest Bahta
(74) *Attorney, Agent, or Firm*—Venable LLP; Robert Kinberg; Cathrine M. Voorhees

(57) ABSTRACT

A method is provided for acting on a product in a machine operating in a machine cycle in the tobacco-processing industry in dependence on information about the product. Information about the product is detected synchronously with the machine cycle. The information is associated with the product asynchronously with respect to the machine cycle. An action is effected on the product synchronously with respect to the machine cycle in dependence on the information associated with the product.

20 Claims, 2 Drawing Sheets

METHOD AND APPARATUS FOR ACTING ON ARTICLES IN THE TOBACCO-PROCESSING INDUSTRY

CROSS-REFERENCE TO RELATED APPLICATION

This application claims the priority of German Patent Application No. 102 16 069.4 filed Apr. 11, 2002. The disclosures of the foregoing priority application and of each and every U.S. and foreign patent and patent application mentioned herein are incorporated herein by reference.

BACKGROUND OF THE INVENTION

The invention relates to a method and an apparatus for processing a product in a tobacco-processing machine operating according to a given machine cycle. Particularly, the product is processed in dependence on information about the product and associated with the product.

German patent document DE 19 00 701 B2, co-owned by the assignee of the present application, discloses writing information about a manufactured product into a cell of a shift register. The information is advanced in the shift register in clock-synchronous relationship with the product to permit timed actuation of actuators arranged at a spacing from the corresponding sensors.

German patent document DE-OS No 21 13 841, owned by Industrial Nucleonics Corporation, discloses a method of tracking and classifying products. As disclosed therein, provided along a production path are a reference point, a plurality of measurement stations, an actuation station, and a counter. The counter is increased as the product passes a reference point. When a product moves past one of the measurement locations, a signal corresponding to the measurement result is formed and stored in a memory having a plurality of cells. The address of the memory cell corresponds to the difference of the current value of the counter and the spacing between the measurement location and the reference point. At the same time, the procedure provides for reading the memory cell whose address corresponds to the difference between the current counter condition and the spacing of the actuation station from the reference point, whereby the corresponding signal reproduces the information belonging to the product just moving past the actuation station. If the information states that the corresponding product is not faultless, the actuation station is activated and the product removed from the production installation.

SUMMARY OF THE INVENTION

It is an object of the present invention is to improve methods and apparatuses for processing a product in a tobacco-processing machine operating according to a machine cycle in dependence on information determined from the product.

According to the invention, this and other objects are attained by detecting information about the product synchronously with the machine cycle, associating the information with the product asynchronously with respect to the machine cycle, and effecting an action on the product synchronously with respect to the machine cycle in dependence on the information associated with the product.

To clearly demonstrate the advantages of the present invention, the basic functions of the method according to the invention and the apparatus according to the invention are described hereinafter.

During a manufacturing process in a machine in the tobacco-processing industry, a product, for example a cigarette, passes through various phases that can be monitored and controlled with sensors and actuators. In particular, the sensors provide information about the product. The items of information can be used in the further course of the process for controlling the machine. As an example, an ejection function can be actuated based on the information to eject products which are assessed as being of poor quality. There are, however, also actions like just-in-time delivery of materials used to produce the product, for example, when delivering materials to a cigarette-making machine when the filter and cigarette should come together precisely. The situation can also occur in a cigarette-making machine that, if a filter is missing, the tobacco sticks must be blown together in order to be able to receive the wrapping paper sheet portion in spite of the missing filter.

Thus, the individual product can be provided with criteria or items of sensor information and can be tracked through the entire machine in order to be able to act on the product at a later time, if necessary. Product tracking must be very closely focused on the production process and, in particular, on the cyclic control of the machine. In conventional systems, the tracking procedure is implemented directly by clock control of the software used in the machine cycle. This, however, disadvantageously involves enormous time demands on the system components. Particularly, because in machines that process 12000 cigarettes per minute, the machine cycle is between about 5 ms and about 10 ms.

The above-mentioned and other disadvantages can be obviated by virtue of dividing product tracking, in accordance with the invention, into machine cycle-synchronous detection and pre-processing; machine cycle-asynchronous further processing or intermediate processing or information association; and machine cycle-synchronous action on the products. By virtue of the invention, only detection of the items of information about the products and the action on the products has to be implemented synchronously with respect to the machine cycle. Intermediate or further processing or association of the information with the individual product can, however, be effected separately, and thus at a slower and therefore less expensive clock cycle. In that way, processing of the detected information, which represents the actual complication and expenditure when tracking the product in the machine, and associating that information with the product are decoupled from the fast machine cycle. Besides the lower level of complication and expenditure in terms of the clock cycle for the processing operation, processing is thus also free from disturbances from sensor signal interrupts produced by the sensor in the conventional machines and methods.

One particular advantage of the invention is that, by virtue of the decoupling of detection and processing of the information, information can be detected with a much higher level of precision, without involving excessive loading in the information-processing control system. Thus, it is possible without any problems to use sensors with a degree of resolution of below 1 ms. The fine resolution which is accordingly possible in regard to actuation of the actuators permits a great reduction in the wastage rate, for example when starting up the machine or when controlling a seam smoothing iron member in cigarette-making machines.

In an exemplary embodiment of the invention, the detected information is linked to a value of a machine cycle-synchronous counter, with the value being ascertained at the moment of the detection step. This value is referred to as the master position. Furthermore, a pair consisting of the information and the counter value is read out asynchronously with respect to the machine cycle, for example via a bus, and made available for the association. This process can be part of a central control. In this respect, the association of the information with the corresponding product can be effected on the basis of the counter value linked thereto. In order to manage large amounts of detected information, it is also possible for a plurality of pairs to be read out simultaneously and made available to the association.

Advantageously, the beginning of the action is determined on the basis of the current machine speed, the ascertained counter value, a predetermined position in respect of detection and a predetermined position in respect of action. The predetermined position in respect of detection and the predetermined position in respect of action can also be defined by associated values of a machine cycle-synchronous counter, i.e., the master position. This association can be effected in the context of a calibration procedure.

In another embodiment of the invention, the association with the product is effected by a procedure whereby the counter value associated with the detection position is first deducted from the detected counter value and then compared to the integral multiple of a counter value corresponding to the spacing of two products in the machine, wherein the multiple ascertained corresponds to a product number.

It is also advantageous in regard to the association if, in the comparison operation, an asymmetrical tolerance is predetermined, within which the multiple as the number of the product is linked to the information ascertained in relation to the counter value at the moment in time of the detection operation. In this way, it is possible to tolerate possible inaccuracies in detection, within predeterminable limits.

Further advantageous embodiments of the invention are set forth below.

BRIEF DESCRIPTION OF THE DRAWINGS

The invention is explained in the following with the aid of an exemplary embodiment and without restricting the general inventive idea.

DETAILED DESCRIPTION OF THE INVENTION

Figure 1:
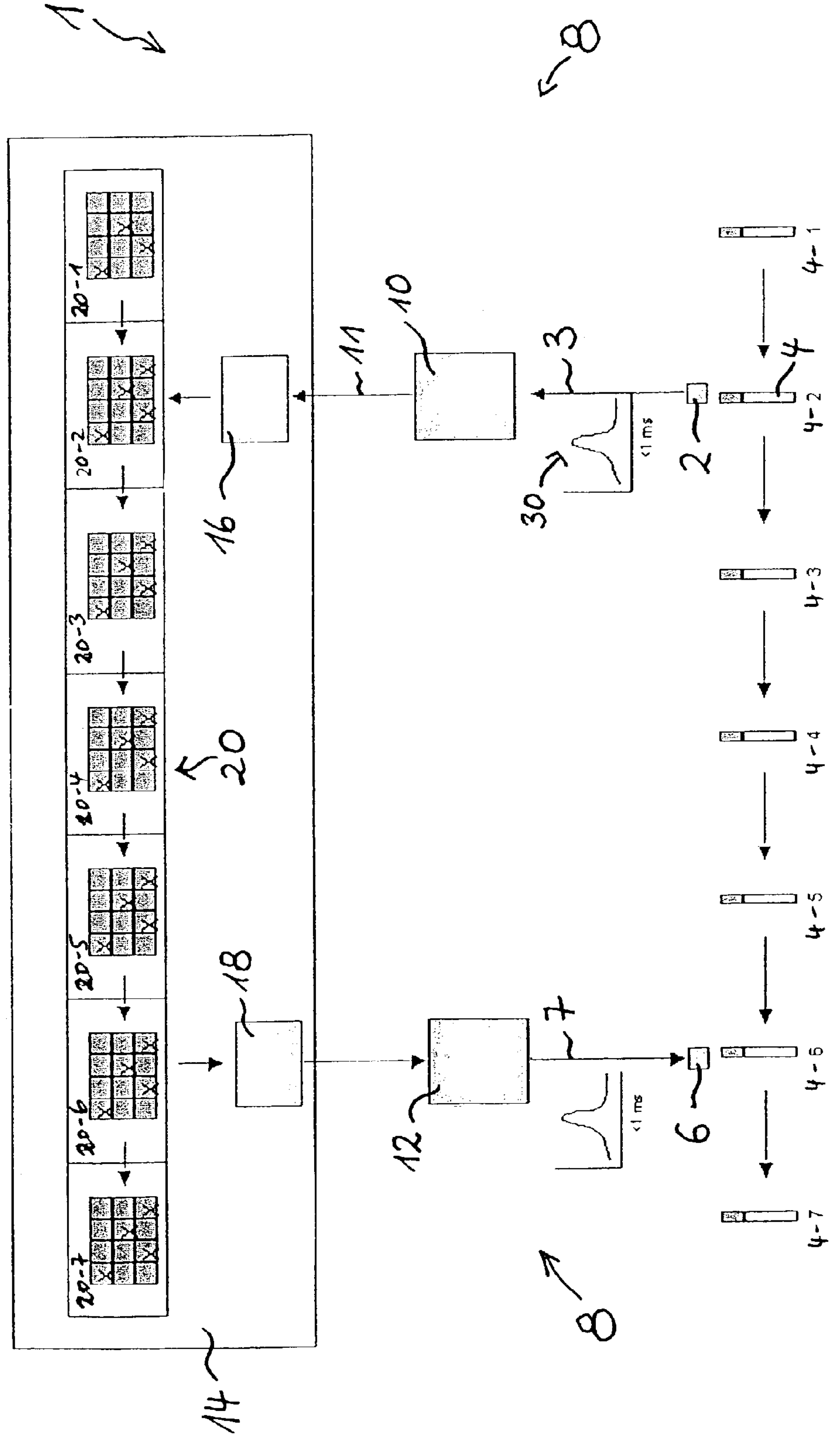
FIG. 1 is a schematic representation of an embodiment according to the invention.

Identical or corresponding parts are given the same reference numerals in the drawings and will not be introduced again.

FIG. 1 shows an overview of one implementation of an operation of tracking a product 4 in accordance with an ejection control procedure as one embodiment of the invention in a machine (not shown) of the tobacco-processing industry. Such a machine may involve, for example, a machine such as PROTOS/MAX manufactured by Hauni Maschinenbau AG. The ejection control 1 and the operating procedure are described hereinafter. The machine includes a sensor 2 that detects items of information about a filter cigarette 4 representing the product, and a valve acting as an actuator 6 for ejection of the product 4, if necessary.

The illustrated ejection control 1 has, between the sensor 2 and the actuator 6, a fast drive system 8 of the machine having a fast input 10 and a fast output 12, a memory-programmed control 14 connected to the drive system 8, with an input 16 and an output 18, and an internal shift register 20 with memory cells 20-1 to 20-7. The fast input 10 is connected to the sensor 2 by a signal line 3 and to the input 16 of the control 14 by a bus 11 and an interface (not shown). The bus 11 also connects the fast output 12 to the output 18 of the control 14 while a further signal line 7 is provided for connecting the fast output 12 to the actuator 6. As symbolically represented in the drawing by a small graph beside the signal line 3, the resolution of the sensor 2 is less than 1 ms. The bus can operate at a clock of 6.4 ms.

In accordance with the embodiment shown in FIG. 1, each of a series of double-filter cigarette 4, referenced 4-1 to 4-7, is detected by the sensor 2 with respect to one of its quality features. The quality feature may be, for example, the density of the tobacco. The sensor 2 may be a light barrier arrangement which detects that a cigarette 4 is present. The information detected by the sensor 2 is delivered by the signal line 3 to the fast input 10 of the drive system 8. The sensor 2 delivers the signals in the machine cycle of the machine (not shown), i.e., approximately every five milliseconds.

The signals from the sensor 2, which are passed to the drive system 8, are received by the fast input 10. As an alternative to the drive system of the machine, it is also possible to provide other components which can perform a comparable function. The drive system 8 can receive the signal from the sensor 2 and link it to a value, which is ascertained at the time of the detection step, of a machine cycle-synchronous counter (not shown). For this purpose, the drive system 8 has a master position which is identical and applicable for the entire machine. The master position is stored or latched with the positive edge of the sensor signal and transmitted by way of the bus 11 to the superior-level control 14. This procedure, compared to the other procedures on the machine, can take place very quickly, and no further performance is required in the system for recognition of the signal, because with the latched master position at which the signal was recognized by the sensor 2, it is to be inferred at any time that the particular product, for example product 4-2, is involved. Due to the highly accurate sensor 2 (with an accuracy of <1 ms, see above), the advantageous high locational resolution is achieved for the product 4.

The production process utilizes a given processing speed with respect to the signals produced by the sensor 2. When dealing with 12000 cigarettes per minute, the sensor 2 will deliver a signal approximately every 5 ms. The ejection control 1 must be capable of detecting all values without a value being lost. If it is assumed that a value must be latched by the drive system 8 every 5 ms, then a new value will appear at the bus interface every 5 ms. However, in that the present embodiment has a bus cycle of only 6.4 ms, it could happen that the previous value is not seen by the interface. This could therefore result in overwritten data. In the illustrated embodiment, this problem is resolved by permitting parallel transmission of a plurality of values. In this embodiment, three values are defined on the interface between the fast input 10 and the control 14. In this case, the interface is operated in a multiplex procedure from the fast input 10.

The parallel transmission of the signals is also implemented in the transmission of signals from the control 14 to the fast output 12. In other respects, the mode of operation of the fast output 12 will be described in greater detail hereinafter.

The control 14 thus receives information as to the master position at which the sensor 2 recognizes a product 4. The information can theoretically be of any age; that is to say there are no time demands in respect of the communication and processing speed of the master position. The control 14 now calculates from the master position, upon detection of the information, an association of the detected information with a given cigarette 4 and enters the criterion of the sensor 2 into the shift register 20 at the correct position, i.e., in the correct memory cell 20-2 of the shift register 20. The precise procedure involved in entry is described hereinafter with reference to FIG. 2. The association must still take place so rapidly that any item of information from the sensor can be associated with a product, but computing power is no longer used to synchronize the procedure involved in the association operation with the master clock, which represents a considerable complication and expenditure in conventional processing machines.

The shift register 20 represents a product-related memory which carries the criteria of the individual sensors 2 but also other items of product-related information, such as items of information which have resulted from the method (first cigarette, uninterrupted zone on the wrapping paper). The shift register 20 reflects the physical structure of the machine and therefore the production process. It is possible to provide for a distribution of the register 20 over a plurality of modules, just as a plurality of shift registers 20 can be brought together at certain node points of the machine. Thus, it is possible to track the filter movement and to track the tobacco sticks. Thus, in a filter-fitting device, for example, two shift registers 20 are combined in a manner which is synonymous with the cigarette 4 being produced by bringing the filter and the tobacco stick together in the actual production procedure.

The shift register 20 is disposed in the control 14, and represents a kind of matrix in which certain properties detected by the sensor 2 are associated in a column with each product entry in a row. In the course of the process, such a matrix is filled step by step and represents the condition of the individual products 4-1 to 4-7. The number of entries into the shift register 20 corresponds in this respect to the possible number of products 4 in the process.

Clock control of the shift register 20 is effected by the master position, i.e., by the information coming from the drive system 8 as to how far for example the product 4-2 has moved in the last time. The actual shift of the shift register 20 is therefore implemented by virtue of that clock control, in which respect the master position specifies how far the shift is to be. In this respect, the data is not shifted in the individual memory cells 20-1 to 20-7 as that is an excessively high level of technical complication and expenditure. Rather, accesses to the individual memory cells 20-1 to 20-7 are provided with an offset.

The items of information from the shift register 20 at certain points in the machine result in actions which directly influence the production procedure in the machine. This can be, for example, the ejection of defective products or the specifically targeted removal of products 4 involving given criteria. Likewise, the presence of the product 4 in a given process position could result in the control of other procedures, for example, switching on and off the feed of material, for example, tobacco. If the valve serving as the actuator 6 is to be operated, the control 14, while also incorporating the current machine speed, calculates the master position at which the drive system 8 is to actuate the output 12. The items of information as to when the valve is to be operated are on the bus interface (not shown) of the fast input 12 of the drive system 8. If the information states that the corresponding cigarette 4, for example the cigarette 4-2, is of poor quality, then cigarette 4-2 has to be sorted out by the ejection control 1. This is effected by a procedure whereby, when the cigarette 4-2 passes into the region of the valve serving as the actuator 6, i.e., it reaches the corresponding master position with the information, the output 12 is addressed and thus the actuator 6 is activated by the line 7 and the cigarette 4-2 is ejected or is transferred onto a removal drum or onto a test center removal device.

The control 14 also calculates the necessary dead time compensation for actuation of the valve constituting actuator 6. In addition, the master position at which the valve constituting actuator 6 is to close again is also calculated. In order to operate the valve in precise relationship with the product and in a correct phase relationship, it is important that the necessary items of information, the master positions for switching the valve on and off, are transmitted from the control 14 to the drive system 8 and the fast output 12 respectively at the right time.

In the embodiment 1 illustrated in FIG. 1, the valve serving as the actuator 6 is a blowing-out valve. Alternatively however, the control 1 can control actuators involving different functions, such as the functions of "pivoting away the wrapping breaker" or "blowing the tobacco sticks together when the filter is missing."

As indicated above, reference will now be made to FIG. 2 to describe the function of associating a sensor signal with a given product cigarette 4 in the control 14. In this association procedure, the inaccuracy of the sensor 2 which occurs in signal generation can be accounted for. This is effected in the form of a window process which is described hereinafter. The window process provides a tolerance for the master position linked to the detected signal, within which the signal is still equated with a master position which is theoretically calculated for a given product.

Figure 2:
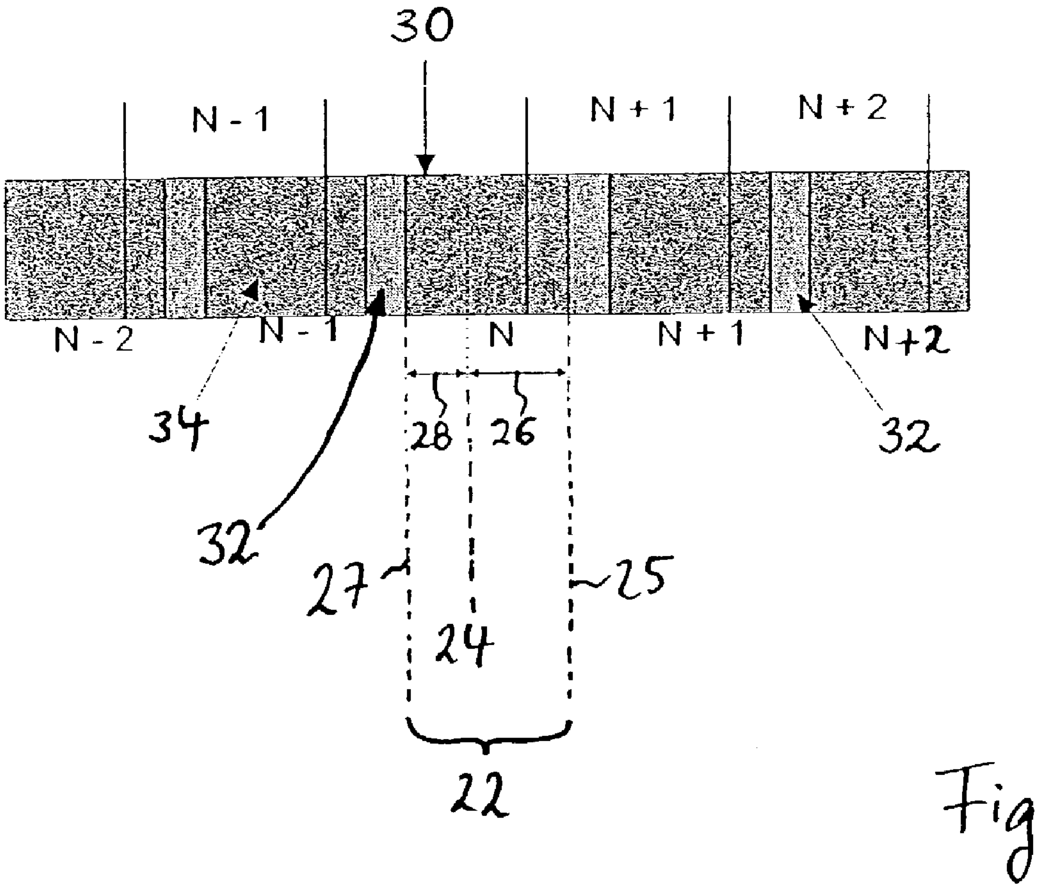
FIG. 2 is a schematic representation of the use of a tolerance in the association of the information with a product.

To clearly show this, FIG. 2 illustrates a portion from the shift register 20 for a product N. A window region 22 is associated with the product N in the control 14. The window 22 is described by 3 criteria: a mean value, a window width and an offset in relation to the product entry with respect to the mean value. In the illustrated example, the offset is 0 as the mean value of the sensor is within the shift register position being considered. The position of the window 22 is ascertained upon calibration of the machine, whereas the window size is fixedly set by physical factors. Reference 24 identifies the master position of the sensor 2.

The window 22 has an upper window limit 25 at a spacing 26 relative to the sensor position and a lower window limit 27 at a spacing 28 relative to the sensor position. The spacings 26 and 28 are of different magnitudes, thus affording an asymmetrical window 22. It is also possible for the spacings 26 and 28 to be of the same size.

If a sensor signal 30 from the control 14 is recognized in the window 22, the corresponding sensor criterion is associated with the product N. Sensor signals which are received outside a window, i.e., in the lighter regions 32, are either rejected by the control 14 or they trigger off corresponding error messages. At any event, such signals do not result in entries in the shift register 20. Alternatively however it is also possible for the windows 22 to adjoin each other without any gap.

Reference numeral 34 denotes the window associated with the product N−1.

As an example to clearly show the operation of the control 14 when associating the signal 30 with a product N, it will be assumed that the products N−1, N, N+1 each pass through the machine at a master position spacing of 100,000. For the position of the sensor 2, it will be assumed that this is in the master position 1,741,538, which was previously ascertained by calibration. The upper window limit 25 is at a master position spacing 26 of a magnitude of 70,000 and the lower window limit 27 is at a master position spacing 28 of a magnitude of 15,000, in a spaced relationship with the position of the sensor 2.

The offset of the window, which is ascertained by calibration, is 0, as mentioned above. As an example, it will now be assumed that the sensor 2 ascertains the value 2,535,784 as the master position at which the sensor criterion was recognized. Now, for the association procedure, in the control 14, the position of the sensor is firstly deducted from that value so that this gives an intermediate value of 794, 246. That intermediate value is less than 15,000 below eight times the product spacing 100,000, but more than 70,000 above seven times the product spacing of 100,000. Thus, it is associated with eight times the product spacing, that is to say the product N=8.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. A method of acting on a series of products in a tobacco-processing machine operating in a machine cycle in dependence on information about a respective product previously associated with the respective product, comprising the steps:

detecting information about the product synchronously with respect to the machine cycle during the operation of the tobacco-processing machine;

associating the detected information with the product asynchronously with respect to the machine cycle; and effecting an action on the product synchronously with respect to the machine cycle in dependence on the information associated with the product.

2. A method according to claim 1, wherein the detecting step includes detecting the information with a sensor.

3. A method according to claim 1, further comprising linking the detected information to a value of a machine cycle-synchronous counter, said value being ascertained at the time of detection.

4. A method according to claim 3, further comprising reading out, asynchronously with respect to the machine cycle, the detected information and the value; and making the detected information and the value available for the associating step.

5. A method according to claim 3, wherein the associating step includes associating the detected information with the corresponding product in accordance with the counter value linked to the detected information.

6. A method according to claim 5, wherein the effecting step includes determining a moment of commencement of the action based on current machine speed, the counter value, a predetermined position of detection, and a predetermined position of the action.

7. A method according to claim 5, wherein the effecting step includes determining a moment of commencement of the action only when the action is established as being necessary based on the information associated with the product.

8. A method according to claim 4, wherein the reading out step includes reading out at a reading out clock speed slower than the machine cycle.

9. A method according to claim 8, wherein the reading out clock speed is no more than one half that of the machine cycle.

10. A method according to claim 4 wherein the detected information and counter value form a pair, and wherein the reading out and making step include reading out and making a plurality of pairs simultaneously.

11. A method according to claim 1, further comprising determining a moment of commencement of the action, wherein a duration of the action is predetermined, and wherein the determining step includes controlling the duration with the inclusion of the moment of the commencement of the action.

12. A method according to claim 1, further comprising defining a predetermined position of the detection and the predetermined position of the action by an association of values of a machine cycle-synchronous counter.

13. A method according to claim 12, wherein the association of values is affected by a calibration.

14. A method according to claim 5, wherein the associating step includes deducting the counter value associated with the detection position from the detected counter value of the product to result in an intermediate value and then comparing the intermediate value to an integral multiple of a counter value corresponding to the spacing of two products in the machine, wherein the multiple corresponds to a number of the product.

15. A method according to claims 14, wherein the comparing step includes providing a predetermined tolerance having a multiple as a number (N) of the product being linked to the information ascertained in relation to the counter value at a moment in time of the detection.

16. A method according to claim 15, wherein the tolerance is asymmetrical.

17. An apparatus for acting on a series of products in a tobacco-processing machine operating according to a machine cycle in dependence on information about a respective product, the apparatus comprising:

a sensor for detecting information about the product in a synchronous relationship with the machine cycle during the operation of the tobacco-processing machine;

a control for associating the detected information with the product in an asynchronous relationship with the machine cycle; and an actuator for acting on the product in a synchronous relationship with the machine cycle in dependence on the information associated with the product.

18. The apparatus according to claim 15, further comprising a machine cycle-synchronous counter; and a linking device for linking the detected information to a value of a machine cycle-synchronous counter, said value being ascertained simultaneously with detection of the information.

19. The apparatus according to claim 18, wherein the information and the counter value form a pair, the apparatus further comprising a bus for reading out the pair asynchronously with the machine cycle and for making the pair available to the control for associating the information with the product.

20. The apparatus of claim 19, wherein the bus is adapted to simultaneously read out a plurality of pairs and make the plurality of pairs available to the control for associating the information with the product.

* * * * *